United States Patent
Kuenzel et al.

(10) Patent No.: US 6,800,980 B2
(45) Date of Patent: Oct. 5, 2004

(54) MULTI-POLE COMMUTATOR MOTOR COMPRISING BRIDGE CONDUCTORS

(75) Inventors: Gerald Kuenzel, Bühl (DE); Jörg Brandes, Baden-Baden Neuweiler (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/297,129

(22) PCT Filed: Jan. 26, 2002

(86) PCT No.: PCT/DE02/00272

§ 371 (c)(1),
(2), (4) Date: May 16, 2003

(87) PCT Pub. No.: WO02/080340

PCT Pub. Date: Oct. 10, 2002

(65) Prior Publication Data

US 2004/0027023 A1 Feb. 12, 2004

(30) Foreign Application Priority Data

Mar. 31, 2001 (DE) .......................... 101 16 183

(51) Int. Cl.[7] ............................................. H02K 23/30
(52) U.S. Cl. ..................... 310/234; 310/195; 310/198
(58) Field of Search ........................ 310/234, 136–142, 310/195, 198, 200, 208, 130, 173

(56) References Cited

U.S. PATENT DOCUMENTS

| 4,227,107 A | * | 10/1980 | Ban et al. .................... 310/198 |
| 4,437,029 A | * | 3/1984 | Ban et al. .................... 310/198 |
| 4,532,449 A | * | 7/1985 | Aoki ............................ 310/198 |
| 4,876,472 A | | 10/1989 | Shiraki et al. ............... 310/198 |
| 6,127,759 A | * | 10/2000 | Tanaka et al. ............... 310/233 |

FOREIGN PATENT DOCUMENTS

| DE | 197 57 279 | 12/1997 | .......... H02K/23/30 |
| WO | WO 99 33159 | 7/1999 | .......... H02K/23/26 |

* cited by examiner

Primary Examiner—Burton Mullins
(74) Attorney, Agent, or Firm—Kenyon & Kenyon

(57) ABSTRACT

The invention relates to a multipole commutator motor (14) having at least four stator poles (16–19) and having armature coils (31–42) that work together with these stator poles and that, for the supply of power, are each connected electrically with two commutator bars (1–12) of a commutator (22), and whose number is greater than the number of the stator poles (16–19), it being provided that, in order to reduce the number of brushes (20, 21; 23, 24) contacting the commutator (22), armature coils (31–42), that form armature poles having identical magnetic orientation are connected in parallel through electrical bridge conductors (43–48) at the armature. For the commutator motor (14), it is proposed that the bridge conductors (43–48) be routed at least partially via armature slots (71–82).

16 Claims, 1 Drawing Sheet

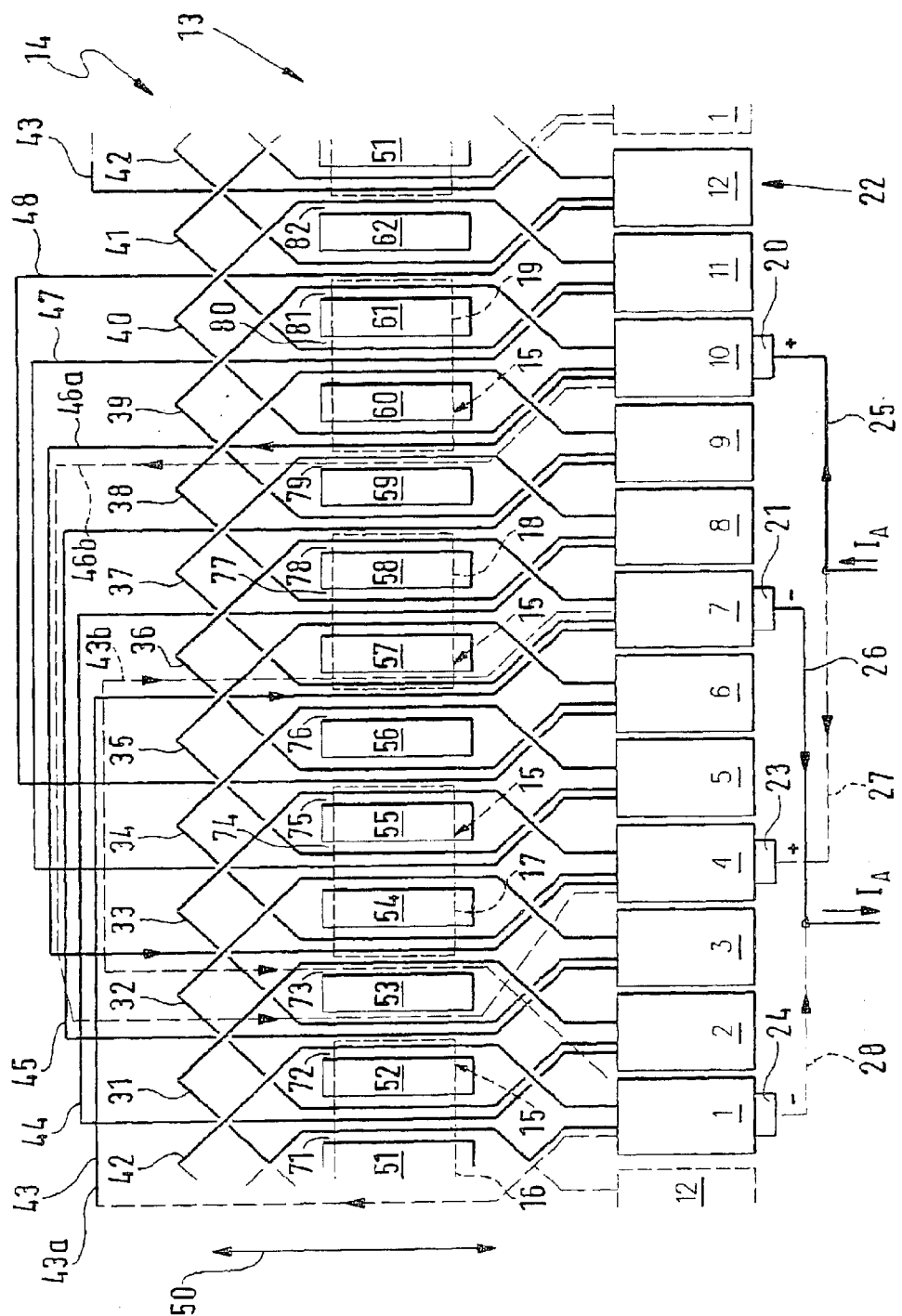

MULTI-POLE COMMUTATOR MOTOR COMPRISING BRIDGE CONDUCTORS

BACKGROUND OF THE INVENTION

The present invention relates to a multipole commutator motor having at least four stator poles and having armature coils that work together with these stator poles. In order to supply power, the armature coils are each connected electrically to two commutator bars of a commutator. The number of armature coils is greater than the number of stator poles; in order to reduce the number of brushes contacting the commutator, armature coils that form armature poles having the same magnetic orientation are connected in parallel by electrical bridge conductors at the armature.

Commutator motors of this sort are used for example as pump drives for anti-lock braking systems in motor vehicles, as servo drives, or as adjusting drives. Commutator motors of this sort can also be referred to as small-power motors, because they standardly cover a power range up to approximately 1 kW.

A typical example of a commutator motor of this sort has for example four stator poles that are preferably permanently excited, and correspondingly has four armature poles that work together with these stator poles and that are formed by armature coils. The armature coils are connected to a commutator at the armature, which commutator is standardly provided with current via four brushes. The brushes slide over commutator bars of the commutator.

In order to save brushes, in the prior art it is known to connect armature coils that form magnetically identically oriented armature poles in parallel, using electrical bridge conductors at the armature. For this purpose, German letters patent DE 197 57 279 C1 proposes that the bridge conductors be formed as commutator bar contact bridges, formed by winding wire and wound on during the winding of the armature coils. Like the armature coils, the bridge conductors are suspended in hooks that are situated on the commutator bars, facing the armature coils. The suspension of the armature coils is unproblematic, because the armature coils extend essentially in the direction of the axis of rotation of the armature, and can thus easily be placed in the hooks. In contrast, the suspension of the bridge conductors is problematic, because these must extend transverse to the direction of the axis of rotation of the armature, because, typically, commutator bars situated diametrally opposite one another are connected with one another by the bridge conductors. In addition, it is necessary to provide an electrically insulated segment on the shaft of the armature in order to support the bridge conductors.

In high-power commutator motors, or those having a power output significantly greater than one kilowatt, commutator bars are connected in parallel by equalizing connections in order to enable equalizing currents to flow between the commutator bars, so that the brushes are not loaded by equalizing currents. However, a reduction of brushes is not provided, and would lead to high commutator currents in such high-power motors, which would result in a problematic current chopping behavior, and possibly even flashing at the commutator.

Advantages of the Invention

In contrast, in the multipole commutator motor according to the present invention the bridge conductors are routed via armature slots, so that "suspension angles" on the commutator bars are possible that are advantageous from the point of view of winding. In the area of their connection—by suspension, soldering, or otherwise—with the commutator bars, the bridge conductors extend essentially along the axis of rotation of the armature, whereas in the prior art they extend transverse to the direction of the axis of rotation in this area. Thus, the present invention significantly simplifies the winding of the armature. In addition, the commutator motor is of compact construction, because no space need be provided between the commutator and the armature teeth for bridge conductors that may have to be situated there. In any case, the provision of the bridge conductors saves brushes, so that the commutator motor according to the present invention can be manufactured economically.

Through the measures stated in the subclaims, advantageous developments and improvements of the inventive commutator motor are possible.

The bridge conductors are each preferably wound around at least two or more armature teeth. Here, it has proved advantageous to manufacture the bridge conductors from winding wire and to suspend them together with the armature coils on the suspension devices provided on the commutator bars for the suspension of the armature coils. Of course, other types of connection are also possible for the electrical connection of the bridge conductors with commutator bars, e.g. soldering, crimping, or welding.

Bridge conductors formed from winding wire can advantageously be wound on immediately during the winding of the armature coils. They are then usefully made of the same winding wire as the armature coils, so that no change of material is required during the installation of the bridge conductors.

In principle, the bridge conductors can be formed from a single electrical conductor, e.g. a single winding wire, of which in each case one end is connected electrically with a commutator bar. This variant of the present invention has proved advantageous in practice.

However, it is also possible to form the bridge conductors from a plurality of line connections, e.g. from two line connections. In this variant, it is possible for the line connections allocated to a bridge conductor to be routed via different armature slots. On the one hand, in this way the current loading of the individual line connections of a bridge conductor is reduced, and on the other hand it is possible, in an advantageous construction of the present invention, for the line connections that are respectively allocated to a bridge conductor to be situated together with the armature coils in the armature slots in such a way that a flow of current is possible that is oriented in the same direction on the respective armature coils and on at least one line connection situated in common in an armature slot. The flow of current oriented in the same direction prevents a weakening of the field of the respective armature coil.

It is advantageously provided that commutator bars situated diametrally opposite one another on the perimeter of the commutator are connected in parallel by a respective bridge conductor. This variant is especially advantageous in the case of a four-pole commutator motor. However, it is of course also possible for commutator motors having more than four poles, e.g. having six or eight poles, to be equipped with the bridge conductors according to the present invention.

Advantageously, supports and/or fixing devices are provided for the holding of the bridge conductors, so that the respective bridge conductors are electrically insulated from an armature shaft that penetrates the armature of the commutator motor. In addition, the supports or fixing devices mechanically stabilize the bridge conductors.

However, the bridge conductors can also advantageously be mechanically fixed by an insulating compound, in particular a casting compound.

In principle, the armature coils can be applied on the armature in various winding variants. In practice, a multipole lap winding has proved advantageous.

A preferred area of application for the present invention is the area of electrical small-power motors, up to a power range of one kilowatt, as are used for example as a pump drive of an antiblocking system for motor vehicles, as a servo drive, or as an adjustable drive.

DRAWING

Exemplary embodiments of the invention are presented in the FIGURE, and are explained in more detail in the following description.

DESCRIPTION OF THE EXEMPLARY EMBODIMENTS

The FIGURE shows the winding diagram of an armature 13 of a four-pole commutator motor 14. Commutator motor 14 has a stator 15 having stator poles 16, 17, 18, 19. Stator poles 16 to 19 can be excited electrically or by permanent magnets.

Armature 13 is situated in stator 15 so as to be capable of rotational motion. Coils 31 to 42 are supplied with current via brushes 20 and 21 that slide over a commutator 22. Commutator 22 has commutator bars 1 to 12 that are connected electrically with coils 31 to 42. Here, coil 31 is connected at one end with commutator bar 1 and at the other end with commutator bar 2, and coil 32 is connected at one end with commutator bar 2 and at the other end with commutator bar 3. Additional coils 33 to 42 are also connected with commutator bars 3 to 12, 1 according to this schema.

Coils 31 to 42 are each made up of a plurality of windings of a metallic conductor, for example an insulated copper wire, each wound multiply around armature teeth 51 to 62, and whose ends are connected electrically with commutator bars 1 to 12. Armature slots 71 to 82 are located between armature teeth 51 to 62; armature slot 71 is situated between armature teeth 51 and 52, armature slot 72 is situated between armature teeth 52 and 53, etc.

Coil 31 is wound multiply around armature teeth 51, 52, and 53, so that its windings lie in armature slots 82, or 73, situated between armature teeth 51, 56, and 53, 54. In addition, coil 31 is electrically connected with commutator bars 1 and 2. Additional coils 32 to 42 are wound around armature teeth 51 to 62 according to the same winding scheme.

Coils 31 to 42 are situated on the armature 13 in a lap winding. In this type of winding, it is inherent that the number of sets of brushes that is required is the same as the number of pairs of exciter poles possessed by the respective commutator; for example, in the concrete case, two sets of brushes each having two brushes. The lap winding can also be referred to as a parallel winding, because the winding parts of the armature are connected in parallel through the brushes of brush sets, which are connected in parallel in the conventional commutator motor.

Commutator bars 1, 7; 2, 8; 3, 9; 4, 10; 5, 11; 6, 12 are connected in parallel by bridge conductors 43 to 48. As a result, only two brushes are required for the contacting of commutator 22, and not four brushes, as is the case in a conventional four-pole commutator motor. Nonetheless, in the FIGURE not only brushes 20 and 21, which are supplied with electrical current via supply lines 25, 26, but also brushes 23, 24, which are connected in parallel to brushes 20, 21, are shown in dashed lines. In fact, however, brushes 23, 24 are not provided in commutator motor 14. This is illustrated in the FIGURE in that supply lines 27, 28 to brushes 23, 24 are depicted in dashed lines.

In the depicted position of armature 13, brushes 20, 21 are adjacent to commutator bars 10, 7, and supply these bars with an electrical armature current $I_A$. From commutator bar 10, one-half ($I_A/2$) of armature current $I_A$ flows via armature coil 40 to commutator bar 11, and from there flows further via coil 41 to commutator bar 12, and from here flows further via armature coil 42 to commutator bar 1. In the conventional commutator motor, armature current $I_A/2$ would be able to flow off via brush 24 and line 28. However, in the present case armature current $I_A/2$ flows via bridge conductor 43 to commutator bar 7, where it can flow off via brush 21.

In the conventional commutator motor, in the depicted armature position the other half of armature current $I_A/2$ would be supplied via commutator bar 4. However, this is not provided in commutator motor 14. Instead of this, armature current $I_A/2$ can flow to commutator bar 4 via bridge conductor 43. From there, it flows through armature coil 34, commutator bar 5, armature coil 35, commutator bar 6, armature coil 36, and commutator bar 7, and is then able to flow off from there via brush 21 and line 26.

Bridge conductors 43 to 48 are routed through armature slots 71 to 82. Here, the same winding diagram is used for all bridge conductors 43 to 48. It is therefore sufficient to explain the winding diagram of bridge conductor 43. Like the other bridge conductors 44 to 48, bridge conductor 43 is also formed in the present case by winding wire, and is wound immediately during the winding of armature 13. Bridge conductor 43 is connected electrically with commutator bar 1. For this purpose, bridge conductor 43 is electrically conductive in, for example, the contact area with commutator bars 1 and 7, for example due to the removal of an enamel insulation that would otherwise be present. Other types of connections between bridge conductors 43 to 48 and commutator bars 1 to 12, e.g. soldering, welding, riveting, or the like, are unproblematically possible.

It has proven advantageous to suspend the bridge conductors in a hook that is situated on commutator bar 1, but is not shown in the FIGURE. From commutator bar 1, bridge conductor 43 leads to armature slot 82, and, passing by armature teeth 51 to 56, to armature slot 76. From armature slot 76, bridge conductor 43 is routed to commutator bar 7, and is electrically connected there.

In any case, bridge conductors 43 to 48 are connected with commutator bars 1 to 12 in such a way that at the common connection points they run essentially parallel, or at only a slight angle, to axis of rotation 50 of armature 13 and of commutator 22. In any case, the present invention—in which bridge conductors 43–48 run in armature slots 71 to 82 that are parallel to axis of rotation 50 or slightly crossed thereto—achieves a very simple connection, from a manufacturing point of view, of bridge conductors 43 to 48 with commutator bars 1 to 12.

For the winding of bridge conductors 43–48 around armature teeth 51 to 62, in principle a variety of winding patterns are possible. In the following, additional variant windings are presented for the examples of bridge conductors 43 and 46.

The already-explained line routing of bridge conductors 43, 46 is designated 43a, 46a in the following. In addition, line connections 43b, 46b are drawn in that are routed partially in other armature slots than are line connections 43a, 46a.

Line connection 43b is routed from commutator bar 1 to armature slot 73, past armature teeth 54, 55, 56 to armature slot 76, and from there to commutator bar 7. This line routing has the result that in the depicted armature position the flow of current on bridge conductor 43b is oriented in the same direction as is the flow of current of the conductors of armature coils 31, 33, or 34, 37, situated in armature slots 73, 76. The flow of current on bridge conductor 43b thus does not result in a weakening of the armature field, but rather can even result in a strengthening of the field.

This also holds for line connection 46b of bridge conductor 46, which is routed from commutator bar 10 via armature slot 79, past armature teeth 59 to 53, to armature slot 72, and from here to commutator bar 4. On line connection 46b as well, in the depicted armature position the flow of current is oriented in the same direction as in the conductors of armature coils 42, 33, or 37, 40, likewise situated in armature slots 79, 72.

In principle, all bridge conductors 43 to 48 could follow both the winding scheme shown in solid lines and explained above and the winding scheme depicted in relation to line connections 43b or 46b.

In addition, it is also possible for a plurality of line paths to be provided for a bridge conductor 43 to 48. For example, bridge conductor 43 could have both line connections 43a, 43b, as well as additional line connections if necessary.

Of course, further variants of the present invention are also possible in principle. In addition, the measures indicated in the description and in the claims can be combined in arbitrary fashion.

What is claimed is:

1. A multipole commutator motor, comprising:
   at least four stator poles;
   a commutator including a plurality of commutator bars;
   a plurality of armature coils that work together with the at least four stator poles and that, for a supply of power, are each connected electrically with the plurality of commutator bars, a number of the plurality of armature coils being greater than a number of the at least four stator poles, and the plurality of armature coils forming armature poles having an identical magnetic orientation;
   a plurality of brushes; and
   a plurality of electrical bridge conductors, wherein:
      in order to reduce a number of the plurality of brushes contacting the commutator,
      the plurality of armature coils are connected in parallel through the plurality of electrical bridge conductors on an armature side, and
      the plurality of bridge conductors are routed at least partially via armature slots.

2. The commutator motor as recited in claim 1, further comprising:
   at least two armature teeth around which each of the plurality of bridge conductors is wound.

3. The commutator motor as recited in claim 1, wherein:
   the plurality of bridge conductors are formed by winding wire and are suspended on suspension devices that are situated on the plurality of commutator bars.

4. The commutator motor as recited in claim 3, wherein:
   the suspension devices include hooks.

5. The commutator motor as recited in claim 3, wherein:
   the plurality of bridge conductors are wound during a winding of the plurality of armature coils.

6. The commutator motor as recited in claim 5, wherein:
   the plurality of bridge conductors are made of the same winding wire as the plurality of armature coils.

7. The commutator motor as recited in claim 1, wherein:
   the plurality of bridge conductors are each formed from a plurality of line connections.

8. The commutator motor as recited in claim 7, wherein:
   the plurality of line connections allocated to a respective one of the plurality of bridge conductors are routed via different armature slots.

9. The commutator motor as recited in claim 8, wherein:
   the plurality of line connections that are respectively allocated to the respective one of the bridge conductors are situated in common with the plurality of armature coils in the armature slots such that a flow of current is possible that is oriented in the same direction on respective ones oft he plurality of armature coils and on at least one of the plurality of line connections situated in common in one of the armature slot.

10. The commutator motor as recited in claim 1, wherein:
    those of the plurality of commutator bars situated diametrally opposite one another on a perimeter of the commutator are connected in parallel by a respective one of the plurality of bridge conductors.

11. The commutator motor as recited in claim 1, further comprising:
    at least one of supports and fixing devices for holding the plurality of bridge conductors so that the plurality of bridge conductors are electrically insulated from an armature shaft.

12. The commutator motor as recited in claim 1, further comprising;
    an insulating compound by which the plurality of bridge conductors are mechanically fixed.

13. The commutator as motor recited in claim 12, wherein:
    the insulating compound includes a casting compound.

14. The commutator motor as recited in claim 1, wherein:
    the plurality of armature coils are wound as multipole lap windings.

15. The commutator motor as recited in claim 1, wherein:
    the number of the plurality of brushes provided for a contacting of the plurality of armature coils is less than a number of the armature poles.

16. The commutator motor as recited in claim 1, wherein:
    the commutator motor is constructed as an electrical small-power motor including one of a pump drive of an anti-lock braking system for a motor vehicle, as a servo drive, and an adjusting drive, in a power range up to 1 kW.

\* \* \* \* \*